(12) United States Patent
Katsube et al.

(10) Patent No.: US 7,209,190 B2
(45) Date of Patent: Apr. 24, 2007

(54) COMMUNICATION TERMINAL DEVICE

(75) Inventors: Yusaku Katsube, Yokohama (JP); Koichi Terui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 10/806,340

(22) Filed: Mar. 23, 2004

(65) Prior Publication Data

US 2005/0122429 A1  Jun. 9, 2005

(30) Foreign Application Priority Data

Dec. 8, 2003  (JP)  ............................. 2003-408410

(51) Int. Cl.
*H04N 5/44* (2006.01)

(52) U.S. Cl. ..................................... 348/838

(58) Field of Classification Search ................. 348/731, 348/732, 733, 725, 723
See application file for complete search history.

(56) References Cited

U.S. PATENT DOCUMENTS

| 5,418,782 | A | * | 5/1995 | Wasilewski | ................. | 370/486 |
| 5,731,741 | A | * | 3/1998 | Yamamoto et al. | ............ | 331/11 |
| 6,340,997 | B1 | * | 1/2002 | Borseth | ....................... | 348/731 |
| 6,445,306 | B1 |   | 9/2002 | Trovato et al. | | |
| 6,597,408 | B1 | * | 7/2003 | Oak et al. | .................... | 348/731 |

| 2002/0126780 | A1 |   | 9/2002 | Oshima et al. | | |
| 2003/0109216 | A1 | * | 6/2003 | Kim et al. | ................. | 455/3.01 |
| 2004/0237122 | A1 | * | 11/2004 | Yamaguchi et al. | ........ | 725/136 |

FOREIGN PATENT DOCUMENTS

| EP | 0 978 940 A1 | 2/2000 |
| JP | 7-111439 | 4/1995 |
| JP | 7-143413 | 6/1995 |
| JP | 8-162909 | 6/1996 |
| JP | 2002-009649 | 1/2002 |
| JP | 2002-271281 | 9/2002 |
| JP | 2002-541740 | 12/2002 |
| JP | 2003-152578 A | 5/2003 |
| JP | 2003-174376 | 6/2003 |

OTHER PUBLICATIONS

Chinese Office Action issued in corresponding Chinese Patent Application No. CN 2004100328690, dated Nov. 10, 2006.

* cited by examiner

*Primary Examiner*—Paulos Natnael
(74) *Attorney, Agent, or Firm*—McDermott Will & Emery LLP

(57) ABSTRACT

A communication terminal device comprising a TV broadcasting tuner for receiving a TV broadcasting, a display device for displaying a video image of the received TV broadcasting, and a transceiver for communicating with a base station. The transceiver acquires base station information for an optional one of base station areas, and acquires a TV broadcasting frequency corresponding to the optional base station area. The TV broadcasting tuner receives the TV broadcasting at the acquired TV broadcasting frequency.

5 Claims, 10 Drawing Sheets

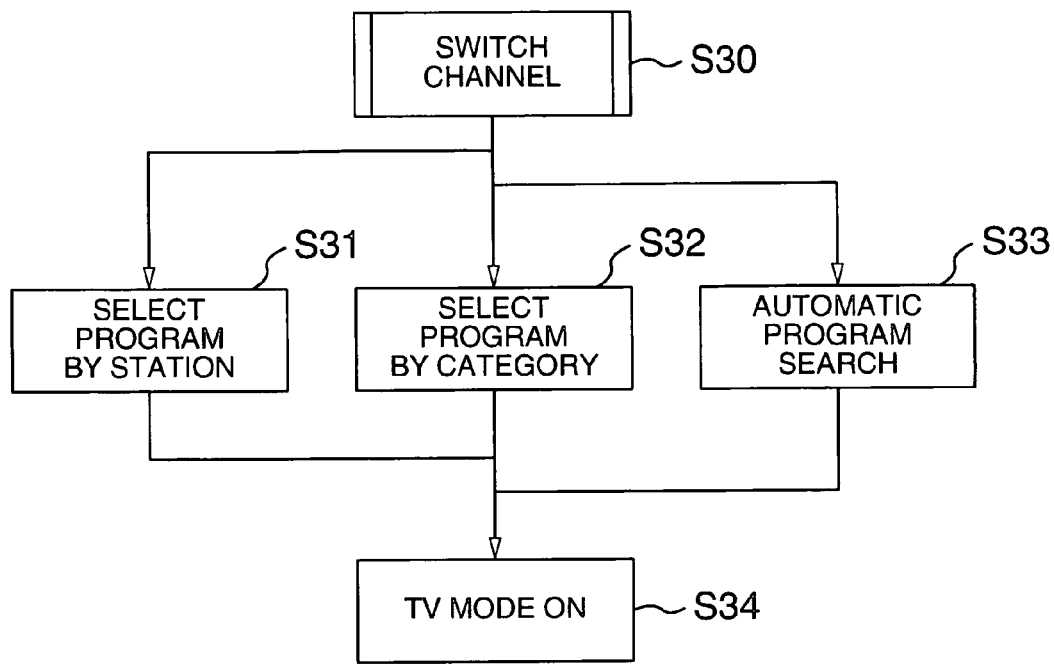

| BASE STATION INFORMATION | RECEIVABLE AREA | FREQUENCY [MHz] |
|---|---|---|
| ⋮ | ⋮ | ⋮ |
| C2 | 20 | 85 |
| C3 | 20 | 85 |
| C4 | 20 | 85 |
| C5 | 20 | 85 |
| C6 | 20 | 85 |
| C7 | 25 | 100 |
| C8 | 25 | 100 |
| C9 | 25 | 100 |
| ⋮ | ⋮ | ⋮ |

FIG.10

| DATE AND TIME | RECEIVABLE AREA | FREQUENCY [MHz] | SIGNAL STRENGTH [dBm] | POSITIONAL INFORMATION |
|---|---|---|---|---|
| 2003/8/27/11:30 | 3 | 95 | −80 | SEAT F IN ROOM E ON D-TH FLOOR IN BUILDING H |
| 2003/8/28/10:30 | 1 | 85 | −85 | SEAT F IN ROOM E ON D-TH FLOOR IN BUILDING A |
| ⋮ | ⋮ | ⋮ | ⋮ | ⋮ |

FIG.11

| POSITIONAL INFORMATION | RECEIVABLE AREA |
|---|---|
| F SEAT IN ROOM E ON D-TH FLOOR IN BUILDING A | 1 |
| F SEAT IN ROOM E ON D-TH FLOOR IN BUILDING B | 2 |
| G SEAT IN ROOM E ON D-TH FLOOR IN BUILDING B | 2 |
| F SEAT IN ROOM E ON D-TH FLOOR IN BUILDING C | 3 |
| F SEAT IN ROOM E ON E-TH FLOOR IN BUILDING D | 4 |
| F SEAT IN ROOM E ON F-TH FLOOR IN BUILDING D | 5 |
| F SEAT IN ROOM E ON D-TH FLOOR IN BUILDING E | 6 |
| F SEAT IN ROOM E ON D-TH FLOOR IN BUILDING F | 7 |
| F SEAT IN ROOM E ON D-TH FLOOR IN BUILDING G | 8 |
| ⋮ | ⋮ |

COMMUNICATION TERMINAL DEVICE

BACKGROUND OF THE INVENTION

The present invention relates to a communication terminal device, for example, a communication terminal device which is capable of receiving television (TV) broadcasting.

Conventionally, a method of setting a TV broadcasting frequency in a communication terminal capable of receiving TV broadcasting is proposed, for example, in JP-A-8-162909 which describes a control method and apparatus that involves acquiring positional information from information on a base station associated with a mobile telephone, and searching TV broadcasting frequencies previously registered in a communication terminal based on the positional information to set an appropriate TV broadcasting frequency to the communication terminal.

Another similar technique proposed, for example, in JP-A-7-111439, which discloses a receiver that can automatically select a broadcasting station, involves comparing information on a current geographical position acquired through the Global Positioning System (GPS) with an area in which a TV broadcasting is to be received, thereby determining a movement of a communication terminal between such areas, and automatically setting a TV television frequency suited to the receivable area of the current position.

However, the control method and apparatus described in JP-A-8-162909 must previously register a large number of base stations installed all over the country, positional information thereon, TV broadcast-ing frequencies, TV broadcasting receivable areas, and the like in correspondence to one another, and therefore fail to set an appropriate TV broadcasting frequency when a new base station is additionally installed or when an existing base station is removed from service. In addition, the control method and apparatus described in JP-A-8-162909 not only entail complicated operations for the registration but also require a large capacity of memories for storing such a huge amount of information, leading to difficulties in reducing the size and cost of the communication terminal. Further, since the huge amount of registered information must be searched for required information on an appropriate base station, positional information, TV broadcasting frequency, a TV broadcasting receivable area, and the like, TV broadcasting radiowaves cannot be normally received during the search, possibly causing fluctuations in a received video image which would interfere with TV watching. Particularly, when a mobile terminal roams among a plurality of receivable areas in which different TV broadcasting frequencies have been set, the image can fluctuate each time the communication terminal moves from one area to another.

The receiver described in JP-A-7-111439 in turn must continuously receive radiowaves from GPS satellites to monitor a current position at all times, and can therefore suffer from large power consumption and a reduced standby time. In addition, when the receiver is situated in an underground town or street or the like where radiowaves from the GPS satellites do not reach, the receiver cannot set a TV broadcasting frequency because of the inability to acquire positional information. Also, as is the case with JP-A-8-162909, the receiver is incapable of more promptly switching TV broadcasting frequency settings, it cannot normally receive TV broadcasting radiowaves during the switching, possibly causing fluctuations in a received video image which would interfere with TV watching.

It is therefore an object of the present invention to provide communication terminal devices which are capable of solving the problems discussed above to improve the usability thereof.

SUMMARY OF THE INVENTION

To achieve the above object, a communication terminal device is provided, according to one aspect of the present invention, which device includes a TV broadcasting receiver for receiving the TV broadcasting, a display unit for displaying a video image of the received TV broadcasting, and a communication unit for communicating with a base station, wherein the communication unit acquires base station information for each base station area, and acquires TV broadcasting frequencies corresponding to the respective base station areas, and the TV broadcasting receiver receives the TV broadcasting at a TV broadcasting frequency acquired by the communication unit.

Accordingly, the present invention makes possible to provide a communication terminal devices which offer improved usability.

Other objects, features and advantages of the invention will become apparent from the following description of the embodiments of the invention taken in conjunction with the accompanying drawings.

BRIEF DESCRIPTION OF THE DRAWINGS

FIG. 5 is a flow chart illustrating a process for switching a TV channel to another;

FIG. 6 is a table showing record information of information on a base station at a past position, a TV broadcasting receivable area, a TV broadcasting frequency, and a signal strength;

FIG. 10 is a table showing record information for storing information on a base station at a past position, a TV broadcasting receivable area, a TV broadcasting frequency, and a signal strength;

FIG. 11 is a table showing neighborhood information for storing positional information acquired from RFID, a TV broadcasting frequency, and a TV broadcasting receivable area;

DESCRIPTION OF THE EMBODIMENTS

For receiving a TV broadcasting by a communication terminal, the present invention enables the communication terminal to set an appropriate TV broadcasting frequency in accordance with a TV broadcasting receivable area by setting the frequency based on base station information associated with a portable or mobile telephone, etc. More specifically, the communication terminal relies on the base station information periodically received thereby to acquire such information as a TV broadcasting receivable area and a TV broadcasting frequency corresponding to the base station information from a server, and sets a TV broadcasting frequency which is suited to the TV broadcasting receivable area. In the following, the concept of the present invention will be described with reference to FIG. 2.

Figure 2:
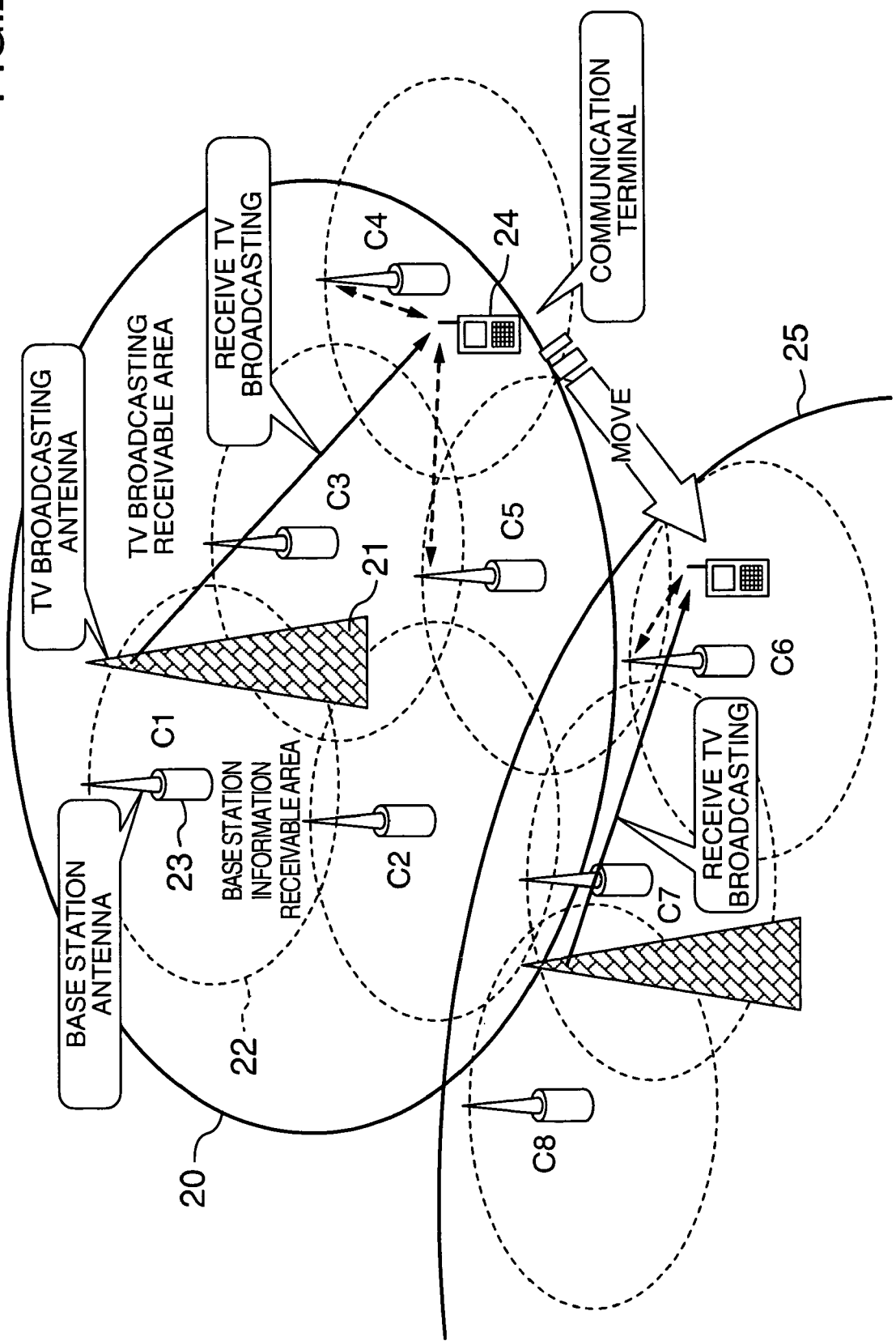
FIG. 2 is a diagram illustrating the concept of the present invention.

FIG. 2 illustrates the relationship between TV broadcasting receivable areas (TV broadcasting areas) and base station information receivable areas (base station areas). A TV broadcasting receivable area 20 refers to an area in which a communication terminal 24 can receive TV broadcasting transmitted from a TV broadcasting antenna 21, while a base station information receivable area 22 refers to an area in which the communication terminal 24 can receive radio-waves transmitted from a base station antenna 23. The communication terminal 24 receives the TV broadcasting from the TV broadcasting antenna 21, and also receives the base station information from the base station antenna 23. Here, the base station information refers to identification information (ID) assigned to respective base stations. In FIG. 2, for example, identification information C1, C2, . . . , C7, C8 is assigned to respective base stations.

In the foregoing situation, assume that the communication terminal 24 moves from the TV broadcasting receivable area 20 to an adjacent TV broadcasting receivable area 25. In a different TV broadcasting receivable area, the communication terminal 24 can fail to receive the broadcasting unless the former frequency is switched to an appropriate frequency. In such an event, the communication terminal 24 may acquire information associated with the base station information, TV broadcasting receivable area, and TV broadcasting frequency from a server, switches to a frequency suited to the TV broadcasting receivable area 25, and can thus continue to receive the TV broadcasting.

In this way, even when the communication terminal 24 moves into a different TV broadcasting receivable area, the communication terminal 24 permits the user to continuously watch the TV broadcasting in a seamless manner with low power consumption without the need for using a special device. Also, since the communication terminal 24 sets the TV broadcasting frequency when a movement of the communication terminal 24 causes a change in the base station information receivable area and/or TV broadcasting receivable area, the power consumption can be reduced. Further, since it is not necessary to previously store base station information, TV broadcasting frequencies, TV broadcasting receivable areas, and the like in a memory of the communication terminal 24 in correspondence to one another, the communication terminal 24 can eliminate the effort of registering such information, does not require a large capacity of memory so that the communication terminal 24 can be reduced in size and cost thereof.

In addition, since the communication terminal 24 acquires the base station information and TV broadcasting frequency in real time, the communication terminal 24 can support an additionally installed base station and a base station removed from service, and therefore will never suffer from the inability to set TV broadcasting frequency due to possible consolidation and abolishment of base stations. Particularly, while the construction of base stations is now under progress for so-called third-generation mobile telephones in a change from one generation to the next, the communication terminal 24 of the present invention can support such a situation. Further, the communication terminal 24 can also support a future change in the TV broadcasting frequencies due to a scheduled transition from the analog broadcasting to the digital broadcasting.

Figures 7, 8:
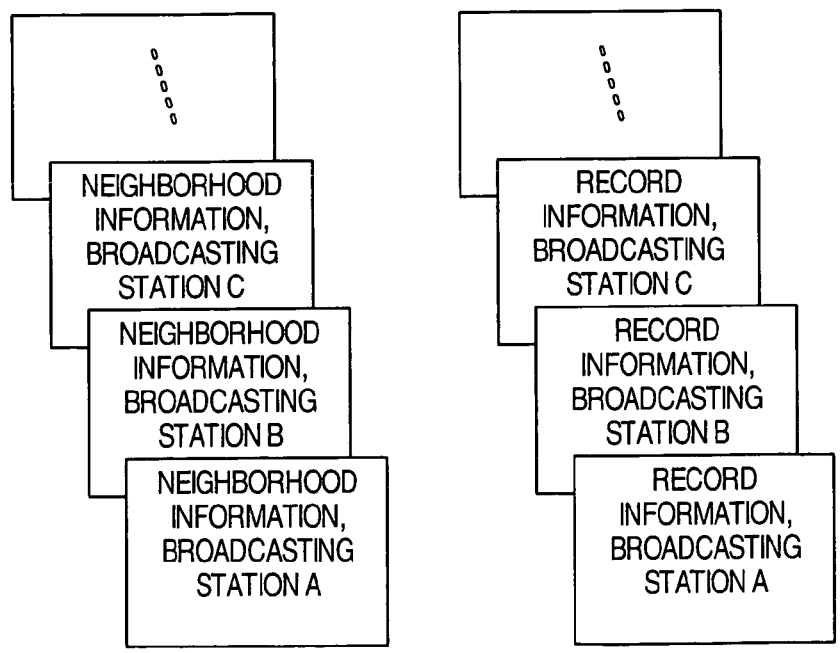
FIG. 7 is a table showing neighborhood information for storing base station information, a TV broadcasting frequency, and a TV broadcasting receivable area.
FIG. 8 is a diagram illustrating the neighborhood information and record information provided for each of broadcasting stations.

Also, the communication terminal 24 previously acquires not only information on a TV broadcasting receivable area in which the communication terminal 24 is currently located, but also base station information and information such as a TV broadcasting receivable area, a TV broadcasting frequency, and the like in a TV broadcasting receivable area adjacent to the current TV broadcasting receivable area (which are collectively called "neighborhood information" hereinbelow), and stores the acquired information in a storage device 11. The neighborhood information may be stored, for example, in a tabular form as shown in FIG. 7, wherein the base station information, TV broadcast-ing receivable area, and TV broadcasting frequency are stored in correspondence to one another. For example, when the communication terminal 24 is located in a base station information receivable area associated with a base station C5 in FIG. 2, the neighborhood information stores the base station information, TV broadcasting receivable area, TV broadcasting frequency, and the like in the TV broadcasting receivable area 25 adjacent to the TV broadcasting receivable area 20. Referring to FIG. 7, the neighborhood information shows that base stations C2–C5 are associated with the TV broadcasting receivable area 20 in which the TV broadcasting frequency should be set to 85 MHz, and base stations C6–C8 are associated with the TV broadcasting receivable area 25 in which the TV broadcasting frequency should be set to 100 MHz. The neighborhood information stores the respective base station information, TV broadcasting receivable areas, and TV broadcasting frequencies in correspondence. The neighborhood information is stored in each broadcasting station (for each channel) in a format as shown in FIG. 8. In this way, even if the communication terminal 24 moves into an adjacent TV broadcasting receivable area, the communication terminal 24 can promptly switch the TV broadcasting frequency because necessary information has been already captured therein, thus making it possible to switch the TV broadcasting frequency with low power consumption. This function is particularly advantageous when the communication terminal 24 repeatedly goes and returns between different TV broadcasting receivable areas. The neighborhood information can be acquired from a server through the base station antenna 23.

The communication terminal 24 also stores record information on base stations into which it has moved in the past, TV broadcasting receivable areas associated with these base stations, TV broadcasting frequencies, signal strengths of TV broadcasting, and the like (hereinbelow collectively called "record information") in the storage device 11. The record information may be stored, for example, in a tabular form as shown in FIG. 6, and stores the date and time at which the record information is updated, as well as the base station information, TV broadcasting receivable area, TV broadcasting frequency, signal strength, and the like at the date and time. With this information, when the communication terminal 24 again moves into a TV broadcasting receivable area into which it has moved in the past, the communication terminal 24 can promptly switch the TV broadcasting frequency because necessary information has been already captured therein, thus making it possible to switch the TV broadcasting frequency with low power consumption. This function is particularly advantageous when the communication terminal 24 repeatedly goes and returns between TV broadcasting receivable areas into which it has moved in the past.

When either the neighborhood information or the record information is not available, the communication terminal 24 can set a TV broadcasting frequency in a TV broadcasting receivable area by acquiring information on the TV broadcasting receivable area based on the currently received base station information, through a mobile telephone, wireless LAN, a wireless network using infrared rays or the like, a wired network using a cable, or an external storage medium such as a memory card.

The foregoing description has been made on the concept of the present invention. In the following, the present invention will be described in greater detail.

(First Embodiment)

A first embodiment of the present invention will be described with reference to the accompanying drawings.

Figure 1:
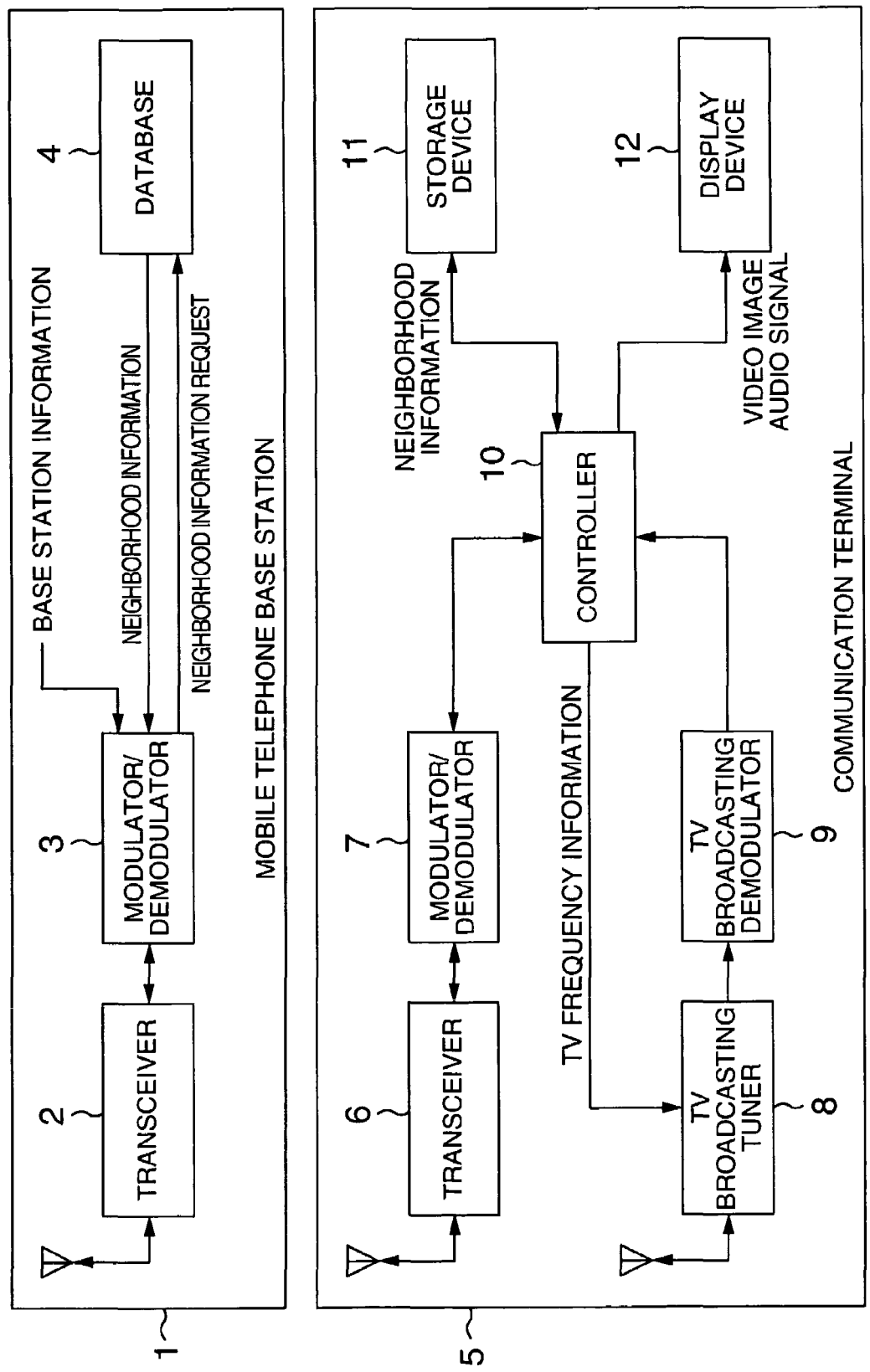
FIG. 1 is a block diagram illustrating the configuration of a communication terminal in a first embodiment of the present invention.

Referring first to FIG. 1, description will be made on the configuration of a communication terminal and a base station.

The base station 1 comprises a base station transceiver 2, and a bases station modulator/demodulator 3. The base station transceiver 2 communicates with the communication terminal 5 through a network. The bases station modulator/demodulator 3 modulates/demodulates information transmitted from or received by the base station transceiver 2.

A database 4 is a server for storing information such as a TV broadcasting receivable area in which the base station 1 is installed, a TV broadcasting frequency to which the communication terminal 5 should be set in this area, an adjacent TV broadcasting receivable area, a TV broadcasting frequency to which the communication terminal 5 should be set in this adjacent area, and the like, in correspondence to one another. The database 4 may be shared by or provided in common to a plurality of base stations, or such a database may be provided in each base station. The shared database can reduce the space required for the installation as well as reduce the cost. While FIG. 1 shows the database 4 installed outside of the base station 1, the database 4 may be installed within the base station 1.

For transmitting the base station information to communication terminals, the base station information is first inputted to the base station information modulator/demodulator 3 for modulation, and then inputted to the base station transceiver 2. Then, the base station information is transmitted from the base station transceiver 2 to communication terminals which are located in the associated base station information receivable area. For transmitting neighborhood information to communication terminals, the base station 1 first requests the database 4 for the neighborhood information. After making the request, the base station 1 retrieves the neighborhood information from the database 4, inputs the neighborhood information to the base station modulator/demodulator 3 for modulation, and then inputs the modulated neighborhood information to the base station transceiver 2. Finally, the neighborhood information is transmitted from the base station transceiver 2 to communication terminals which are located in the associated base station information receivable area.

The communication terminal 5 comprises a transceiver 6, a modulator/demodulator 7, a TV broadcasting tuner 8, a TV broadcasting demodulator 9, a controller 10, a storage device 11, and a display device 12. The transceiver 6 communicates with the base station 1 through a network. The modulator/demodulator 7 modulates/demodulates information transmitted from or received by the transceiver 6. The TV broadcasting tuner 8 receives TV broadcasting. The TV broadcasting demodulator 9 demodulates a TV broadcasting signal received by the TV broadcasting tuner 8. The controller 10, which is responsible for controlling the overall communication terminal 5, controls the transceiver 6, modulator/demodulator 7, TV broadcasting tuner 8, TV broadcasting demodulator 9, storage device 11, and display device 12. The controller 10 also detects a movement, if any, of the communication terminal 5 into another base station information receivable area or another TV broadcasting receivable area. The storage device 11 stores programs and a variety of information such as data, as well as the base station information, neighborhood information, record information, and the like. The display device 12 displays video image information, character information, and the like.

For receiving the base station information and/or neighborhood information transmitted from the base station 1, the information is received by the transmitter 6, demodulated by the modulator/demodulator 7, and then stored in the storage device 11 under control of the controller 10. For receiving TV broadcasting, the TV broadcasting tuner 8 receives the TV broadcasting which is then demodulated by the TV broadcasting demodulator 9, followed by presentation of a video image and a speech from the display device 12 under control of the controller 10.

In this event, for setting a TV broadcasting frequency, the controller 11 references the neighborhood information and record information stored in the storage device 11 based on the base station information to retrieve a desired TV broadcasting frequency therefrom. Specifically, the controller 10 confirms a current TV broadcasting receivable area from the base station information, and retrieves from the storage device 11 a TV broadcasting frequency suited to this TV broadcasting receivable area. The controller 10 outputs the retrieved TV broadcasting frequency to the TV broadcasting tuner 8 which is set (tuned) to the frequency.

When the communication terminal 5 moves between different TV broadcasting receivable areas, the controller 10 references the neighborhood information and record information stored in the storage device 11 based on the base station information to retrieve an appropriate TV broadcasting frequency, and sets the TV broadcasting tuner 8 to the retrieved TV broadcasting frequency. Specifically, since a different TV broadcasting receivable area is associated with a different base station, the controller 10 retrieves neighborhood information corresponding to the TV broadcasting receivable area from the storage device 11, so that the TV broadcasting tuner 8 can be automatically set to a frequency suited to that area even if a different TV broadcasting frequency is used in that area. In this event, if the storage device 11 has not stored necessary information such as the TV broadcasting area, TV broadcasting frequency and the like as the neighborhood information and record information, the communication terminal 5 acquires the information from the server.

The TV broadcasting tuner 8 is tuned only when the communication terminal 5 moves into a different TV broadcasting receivable area or when different base station information is provided to the communication terminal 5. In this way, the tuning operation is not needed when a TV program is watched in the same TV broadcasting receivable area. Also, since a determination as to whether or not the tuning is needed is made using the base station information of the mobile telephone, power consumption required for the determination is substantially similar to that required for a standby operation of the mobile telephone. Specifically, the communication terminal 5 can more promptly switch the TV broadcasting frequency with lower power consumption because the determination is made as to whether or not the tuning is needed only when different base station information is provided and because no communication is needed for the determination which is made based on the base station information and neighborhood information stored in the storage device 11.

Figure 3:
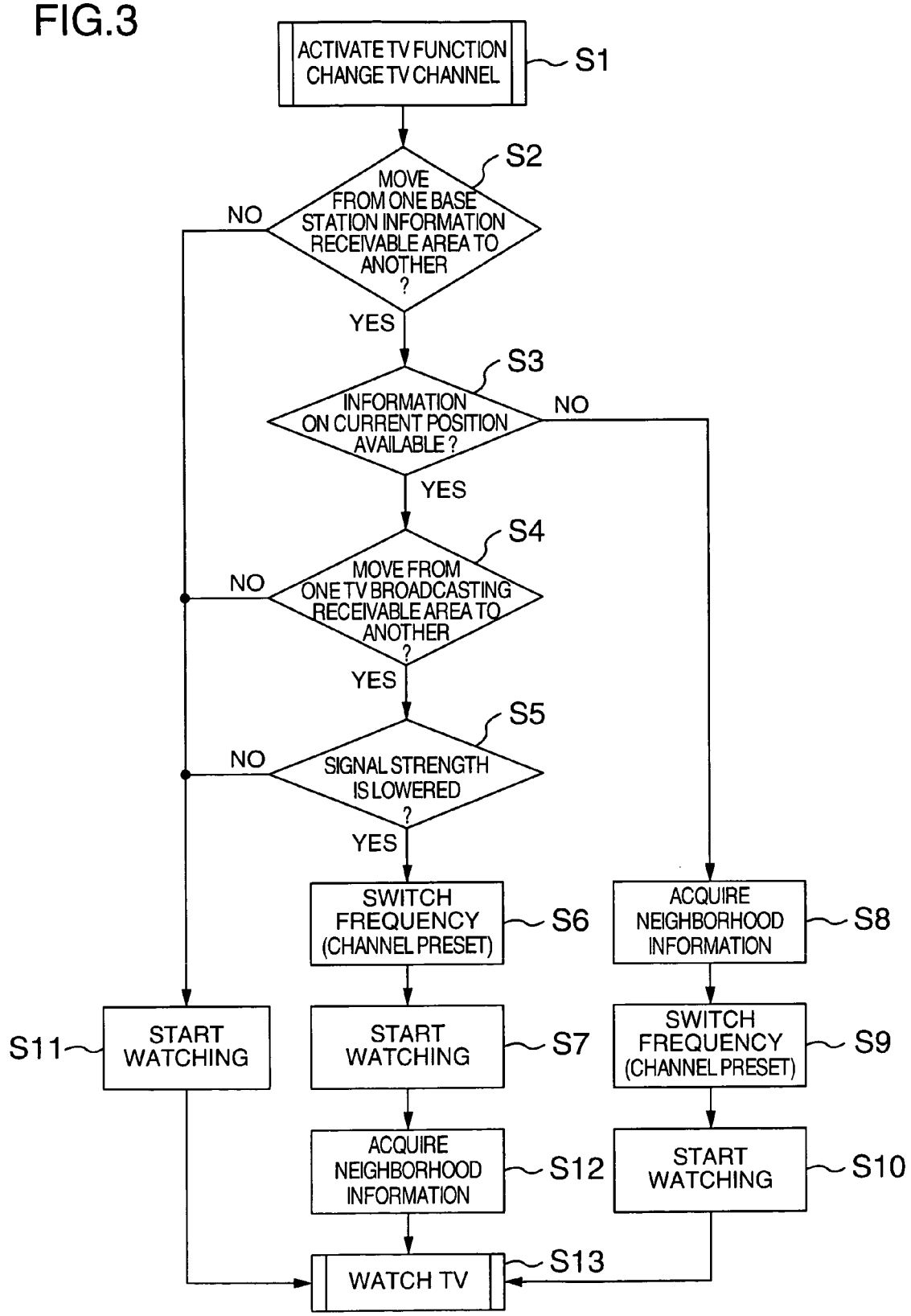
FIG. 3 is a flow chart illustrating a process executed when a TV function is activated.

Referring next to FIG. 3, description will be made on a process which is executed until the user starts watching a TV program when the user activates a TV function or changes a TV channel.

(1) When the user activates the TV function or changes one TV channel from another (S1), the controller 10 determines whether or not the communication terminal 5 has moved from one base station information receivable area to another (S2). Specifically, when the TV function is activated, the controller 10 retrieves the record information (FIG. 6) from the storage device 11 to compare base station information when a TV program was watched the last time with current base station information. On the other hand, when the user changes one TV channel to another, the controller 10 retrieves the record information (FIGS. 6 and 8) for each channel to compare base station information when a TV program was watched on a TV channel after the change with the current base station information. For example, when the user changes the TV channel from a broadcasting station A to a broadcasting station B, the controller 10 compares the base station information when a program was watched on the broadcasting station B the last time with the current base station information.

As a result, if the base station remains unchanged, as determined at S2, this means that the communication terminal 5 is located in the same base station information receivable area and accordingly in the same TV broadcasting receivable area, followed by a transition of the process to S11 for allowing the user to start watching a TV program without setting a different TV broadcasting frequency. In this way, the user can start watching a TV program in a shorter time with lower power consumption. In addition, the communication terminal 5 eliminates the need for a connection to the outside for acquiring the neighborhood information.

On the other hand, if the current base station is different from the previous one, as determined at S2, the communication terminal 5 is determined to be located in a different base station information receivable area, followed by a transition of the process to S3. For example, the record information in FIG. 6 shows that the base station information currently received from a base station indicates C5, and the previous base station information (received at 10:30 on 28 Aug. 2003) indicates C1. Thus, it is determined from the different base station information that the communication terminal 5 is located in a different base station information receivable area from that when the television was watched the last time or when the TV broadcasting tuner 8 was tuned to the same TV channel the last time for watching.

(2) If the communication terminal 5 has moved from one base station information receivable area to another, as determined at S2, the controller 10 searches the storage device 11 to confirm the presence or absence of information such as a base station, a TV broadcasting receivable area, a TV broadcasting frequency, and the like corresponding to a current position (S3). Specifically, it is confirmed whether or not the communication terminal 5 has already acquired information corresponding to the current position as the neighborhood information (FIGS. 7 and 8) and the record information (FIGS. 6 and 8) before it moved to the current base station information receivable area. The search is made by first referencing the record information, and then referencing the neighborhood information. In this way, the TV frequency can be immediately switched because a very fast search can be carried out when the same TV program is still continuously watched when the communication terminal 5 moves from one TV broadcasting receivable area to an adjacent TV broadcasting receivable area, or when the same TV program is watched while the communication terminal 5 goes and returns between different TV broadcasting receivable areas. For example, when the current base station information indicates C5, this information is included in the record information (received at 11:30 on Aug. 27, 2003), so that information corresponding to the current position is determined to exist in the storage device 11.

If there is no information corresponding to the current position, as determined at S3, the process proceeds to S8, wherein the controller 10 acquires such information as a base station information receivable area, a TV broadcasting receivable area, a TV broadcasting frequency, and the like corresponding to the current position from the server. Not only the information corresponding to the current position, the communication terminal 5 also acquires the neighborhood information (S8). The communication terminal 5 switches to an appropriate TV broadcasting frequency based on the information acquired at S8 (S9) to permit the user to start watching the TV broadcasting (S10). It should be noted that the communication terminal 5 acquires not only the information corresponding to the current position but also the neighborhood information at S8 in order for the communication terminal 5 to eliminate the need for connection to the outside for acquiring the TV broadcasting frequency even if the communication terminal 5 moves to an adjacent base station information receivable area while the TV broadcasting is being watched.

On the other hand, if there is information corresponding to the current position, as determined at S3, the process proceeds to S4.

(3) If there is information corresponding to the current position, as determined at S3, it is confirmed whether or not the communication terminal 5 has moved from one TV broadcasting receivable area to another (S4). Specifically, the controller 10 retrieves the record information (FIG. 6) and neighborhood information (FIG. 7) to compare a TV broadcasting receivable area in which the television was watched the last time or when the TV broadcasting tuner 8 was tuned to the same TV channel the last time for watching with the current TV broadcasting receivable area. For example, when the current base station information is C1, the current TV broadcasting receivable area is determined to be "1" from the record information, while the previous base station information (received at 10:30 on Aug. 28, 2003) is determined to be C5, and the TV broadcasting receivable area to be "3." Also, for example, when the user has changed the TV channel from the broadcasting station A to the broadcasting station B, the controller 10 compares the TV broadcasting receivable area in which the user watched a program from the broadcasting station B the last time with the current TV broadcasting receivable area.

If the communication terminal 5 remains in the same TV broadcasting receivable area, as determined at S4, i.e., the TV broadcasting tuner 8 has been set at the same TV broadcasting frequency, the process proceeds to S11, where the user starts watching a TV program at the TV broadcasting frequency in the same TV broadcasting receivable area as the previous one without setting another TV broadcasting frequency. In this way, the user can start watching the TV program in a shorter time with lower power consumption. In addition, the communication terminal 5 need not be connected to the outside for acquiring the TV broadcasting frequency.

On the other hand, if the communication terminal 5 has moved to a different TV broadcasting receivable area, as determined at S4, it is determined that the TV broadcasting tuner 8 should be set to a different TV frequency, causing the process to proceed to S5. For example, the record information in FIG. 6 shows that the current TV broadcasting receivable area is "3," and the previous TV broadcasting receivable area (at 10:30 on Aug. 28, 2003) is "1," from which it is determined the communication terminal 5 has moved into a different TV broadcasting receivable area from a TV broadcasting receivable area in which the television was watched the last time or the TV broadcasting tuner 8 was tuned to the same TV channel the last time for watching.

(4) If the communication terminal 5 has moved to a different TV broadcasting receivable area, as determined at S4, the controller 10 confirms the signal strength of the TV broadcasting (S5). Specifically, the controller 10 retrieves the record information to compare the signal strength which was detected when the television was watched the last time or when the same TV channel was selected the last time with the current signal strength. Even if the communication terminal 5 has moved into a different TV broadcasting receivable area, the signal strength at the TV broadcasting frequency in the previous TV broadcasting receivable area may be higher than the current signal strength depending on the surrounding situation, in which case the TV broadcasting frequency is preferably maintained unchanged.

The signal strength may be lowered depending on the surrounding situation, for example, due to geographical problems and/or obstacles such as a mountain zone, a hilly terrain, a valley between tall buildings, and the like. It is also contemplated that appropriate reception is impeded by meteorological conditions such as a heavy rain, a heavy snow, thunder, and the like. It is further contemplated that appropriate reception is impeded by TV broadcasting antenna in a bad condition. Under such a situation, the analog broadcasting suffers from increased noise and resulting poor video images and degraded sound quality. On the other hand, the digital broadcasting may suffer from missing frames and interruption of video image as well as broken sound due to the inability to fully correct errors. To avoid such troubles, it is desired to set the TV television tuner 8 to the TV broadcasting frequency in the previous TV broadcasting receivable area rather than the TV broadcasting frequency in the current TV broadcasting receivable area.

If the signal strength is not lowered, as determined at S5, it is determined that the signal strength at the previous TV broadcasting frequency is higher than the signal strength at the current TV broadcasting frequency so that a better receiving condition can be ensured at the previous TV broadcasting frequency, followed by a transition of the process to S11 to start watching the television without setting a different TV broadcasting frequency. In this way, the user can start watching the television in a shorter time with lower power consumption.

On the other hand, if the signal strength is lowered, as determined at S5, it is determined that the signal strength at the current TV broadcasting frequency is higher than the signal strength at the previous TV broadcasting frequency so that a better receiving condition can be ensured at the current TV broadcasting frequency, causing the process to proceed to S6, where the TV broadcasting frequency is switched.

(5) If it is determined through S2 to S5 that the TV broadcasting frequency should be switched, the controller 10 of the terminal device 5 switches the TV broadcasting frequency (S6). For switching the TV broadcasting frequency, the controller 10 sends information on the TV broadcasting frequency to the TV broadcasting tuner 8 which is tuned to a desired frequency, such that the TV broadcasting frequency is corresponded to a program (a broadcasting station or a channel) to be watched. For example, when the communication terminal 5 is currently located in the TV broadcasting receivable area 3, the controller 10 references the record information and neighborhood information to look for a TV broadcasting frequency suited thereto, and identifies the frequency of 95 MHz. The TV broadcasting tuner 8 is then set to this frequency. Similar operations are performed at S9.

(6) As the TV broadcasting tuner 8 is set to the TV broadcasting frequency for the particular TV broadcasting receivable area, the communication terminal 5 is ready for start watching TV broadcasting to permit the user to watch a TV program (S7). In other words, the TV broadcasting can be received at the newly set TV broadcasting frequency. This is applied to S10 as well.

(7) At the time the TV watching can be started, the communication terminal 5 acquires the neighborhood information (S12). Specifically, the communication terminal 5 acquires information such as the base station information, TV broadcasting frequency, and the like in a TV broadcasting receivable area adjacent to the current TV broadcasting receivable area.

For acquiring the neighborhood information, the communication terminal 5 transmits a neighborhood information request to an associated base station. Upon receipt of the neighborhood information request, the base station accesses the database through a network such as the Internet, selects the neighborhood information to be transmitted based on the base station information associated with the request, and transmits the neighborhood information to the communication terminal 5. The communication terminal 5 stores the received neighborhood information in the storage device 11. In this way, the communication terminal 5 has previously acquired information on the adjacent TV broadcasting receivable area, so that even when the communication terminal 5 moves into the adjacent TV broadcasting receivable area, it can immediately switch the TV broadcasting frequency thanks to the previously acquired information necessary to the switching, thereby making it possible to switch the TV broadcasting frequency with lower power consumption.

Also, at the time the TV watching can be started, the communication terminal 5 updates the record information. Specifically, the communication terminal 5 newly stores the current time, base station information, TV broadcasting receivable area, TV broadcasting frequency, signal strength, and the like as the record information. In this way, when the communication terminal 5 again moves into the current TV broadcasting receivable area in future, it can immediately switch the TV broadcasting frequency thanks to the previously acquired information necessary to the switching, thereby making it possible to switch the TV broadcasting frequency with lower power consumption.

The acquisition of the neighborhood information and the update of the record information may be performed after the user has started watching the television, more specifically after the communication terminal 5 has started displaying received TV broadcasting on the display device 12, so that the user is allowed to start watching the television earlier.

The foregoing description has been made on the process which is executed until the user starts watching a TV program when the communication terminal 5 activates a TV function or changes a TV channel.

Figure 4:
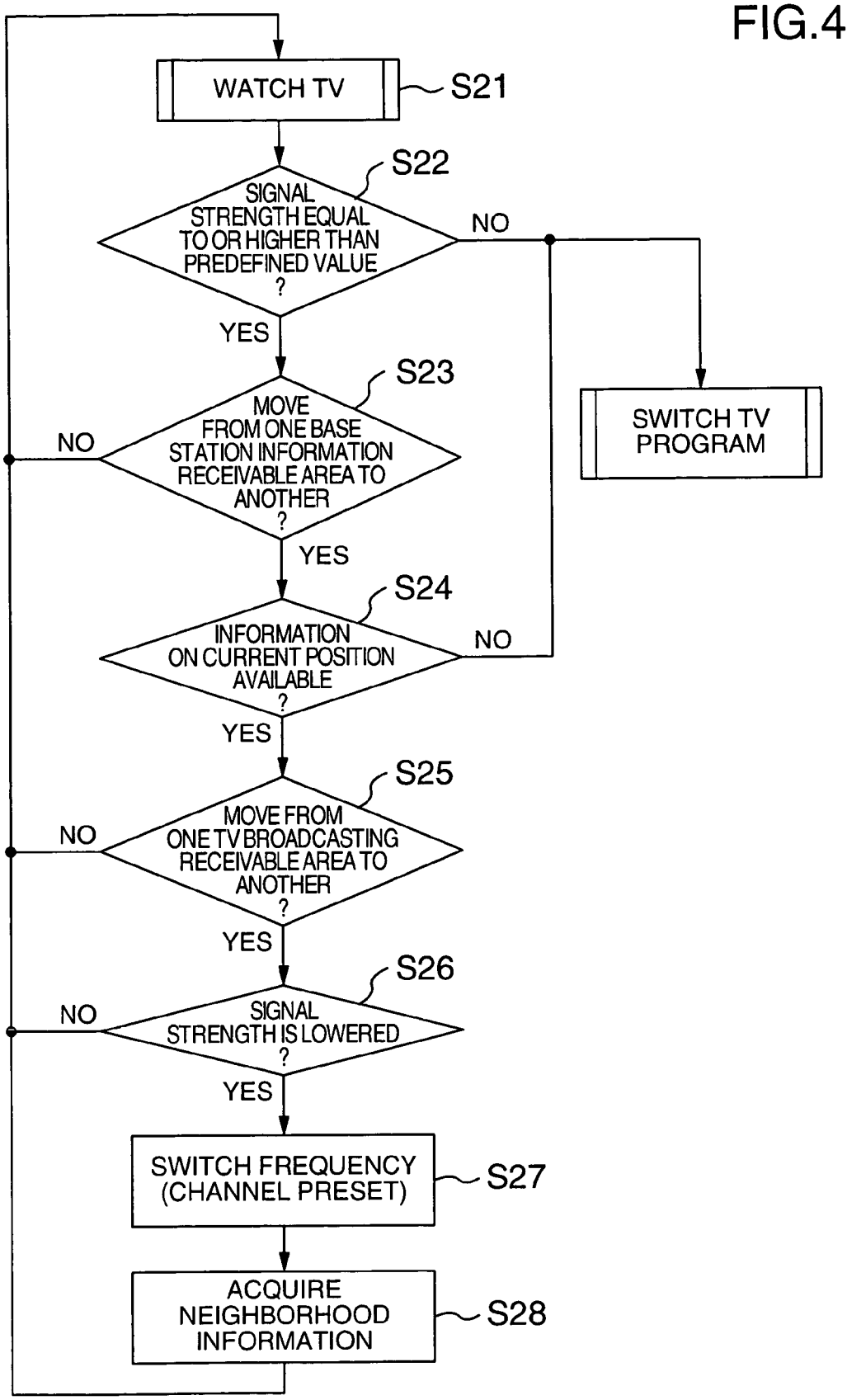
FIG. 4 is a flow chart illustrating a process executed while a user is watching a TV broadcasting program.

Referring next to FIG. 4, description will be made on a process executed while a user is watching a TV broadcasting program. More specifically, described below is a process which is executed when the user activates the TV function to watch the TV broadcasting, and when the user has changed a previous channel to another channel and is watching a program on this channel.

(1) When the user is watching the television (S21), it is determined whether or not the signal strength of the TV broadcasting is equal to or higher than a predefined value (S22). Specifically, the signal strength of the currently watched TV broadcasting is confirmed through the TV broadcasting tuner 8. Here, the signal strength may be determined to be equal to or lower than the predefined value when the television broadcasting cannot be properly received due to geographical problems or any obstacles, when the TV broadcasting cannot be properly received due to a meteorological condition, or when the TV broadcasting cannot be properly received due to a bad condition of the TV broadcasting antenna, and the like. Among others, the signal strength falls below the predefined value when the signal strength is too low to watch the television.

In such an event, the TV broadcasting tuner 8 should be properly switched to a TV broadcasting frequency of another broadcasting station which is broadcasting the same program, rather than continuing to watch the program at the current TV broadcasting frequency. In this way, the user can continue to watch the same program.

If there is no broadcasting station which is broadcasting the same program, it may be proper to switch to another program of the same category. For example, whichever news program, weather forecast, and the like seem to be similar in contents, so that the user can watch desired information by switching to another program of the same category.

If there is no broadcasting station which is broadcasting the same program, it may be proper to switch to a TV broadcasting frequency of a program provided by a broadcasting station belonging to the same family. For example, the same team may be handled in sport relay programs by several broadcasting stations in the same family, so that the TV broadcasting tuner 8 may be switched to a program provided by one of those broadcasting stations belonging to the same family, thereby permitting the user to watch desired, information.

If the signal strength is equal to or lower than the predefined value, as determined at S22, it is determined that there is no program broadcast at the TV frequency set at the current position, or that the signal strength is equal to or lower than a level at which the TV broadcasting can be watched, followed by a transition of the process to a TV channel selection flow (S30), later described. On the other hand, if the signal strength is equal to or higher than the predefined value, as determined at S22, the process proceeds to S23 with the set TV frequency remaining unchanged.

(2) It is determined whether or not the communication terminal 5 has moved from one base station information receivable area to another (S23). Specifically, it is determined whether or not the communication terminal 5 has moved into a different base station information receivable area while the user is watching the TV broadcasting. The processing at S23 is similar to that at S2 in FIG. 2.

If the communication terminal 5 has not moved from one base station information receivable area to another, as determined at S23, the user is permitted to continuously watch the TV broadcasting without setting the TV broadcasting tuner 8 to another TV broadcasting frequency. This is because since the communication terminal 5 remains in the same base station information receiving area, the communication terminal 5 is determined to also remain in the same TV broadcasting receivable area.

On the other hand, if the communication terminal 5 has moved from one base station information receivable area to another, as determined at S23, the process proceeds to S24.

(3) If the communication terminal 5 has moved from one base station information receivable area to another, as determined at S23, it is determined whether or not the memory 11 of the communication terminal 5 stores information such as a base station, a TV broadcasting receivable area, a TV broadcasting frequency, and the like corresponding to a current position (S24). Specifically, it is confirmed whether or not the communication terminal 5 has already acquires information corresponding to the current position as the neighborhood information and the record information before it moved into the current base station information receivable area. This processing is similar to that at S3 in FIG. 3.

If the memory 11 does not store the information corresponding to the current position, as determined at S24, the process proceeds to the TV channel selection flow (S30), later described.

On the other hand, if the memory 11 stores the information corresponding to the current position, as determined at S24, the process proceeds to S25.

(4) If the memory 11 stores the information corresponding to the current position, as determined at S24, it is determined whether or not the communication terminal 5 has moved from one TV broadcasting receivable area to another (S25). This processing is similar to that at S4 in FIG. 3.

If the communication terminal 5 has not moved from one TV broadcasting receivable area to another, as determined at S25, it is determined that the TV broadcasting frequency need not be switched, thus permitting the user to continue to watch the television.

On the other hand, if the communication terminal 5 has moved from one TV broadcasting receivable area to another, as determined at S25, the process proceeds to S26.

(5) If the communication terminal has moved from one TV broadcasting receivable area to another, as determined at S25, the controller 10 confirms the signal strength of the TV broadcasting (S26). Specifically, the controller 10 compares the signal strength in the current TV broadcasting receivable area with the signal strength in the previous TV broadcasting receivable area. This processing is similar to that at S5 in FIG. 3.

If the signal strength is not lowered, as determined at S26, the user is permitted to continuously watch the TV broadcasting at the previously set TV frequency.

On the other hand, if the signal strength is lowered, as determined at S26, the TV broadcasting tuner 8 must be tuned to the TV broadcasting frequency in the current TV broadcasting receivable area, causing the process to proceed to S27.

(6) If it is determined through S22 to S26 that the TV broadcasting frequency should be switched, The TV broadcasting tuner 8 is switched from the current TV broadcasting frequency to another (S27). This processing is similar to that at S6 in FIG. 3.

(7) The communication terminal 5 acquires the neighborhood information (S28). Also, the communication terminal 5 updates the record information. This processing is similar to that at S12 in FIG. 3. After this processing has been completed, the process returns to S21, permitting the user to continuously watch the TV broadcasting.

Next, the processing in the TV channel selection flow (S30) will be described with reference to FIG. 5.

The TV channel selection flow is executed when the communication terminal 5 is in a situation in which the TV broadcasting cannot be watched, such as when it is determined at S22 that the signal strength of the TV broadcasting is equal to or lower than the predefined value, or when it is determined at S24 that the memory 11 of the communication terminal 5 does not store information corresponding to the current position, or the like. The TV channel selection flow is also executed when the user switches from one TV broadcasting program to another.

In such a situation, it is proper to switch the TV broadcasting tuner 8 to a TV broadcasting frequency of another broadcasting station which is broadcasting the same program, or to a program of the same category, or to a program broadcast from a broadcasting station belonging to the same family, as described above. Such switching is preferably performed automatically by the communication terminal 5. This is because the user cannot continuously watch a program unless the switching is automatically performed, or the user himself must switch the TV broadcasting frequency, and this will cause the user to feel troublesome. In this event, the channel selection flow is preferably executed to appropriately select a program in accordance with the user's will.

Figure 12:
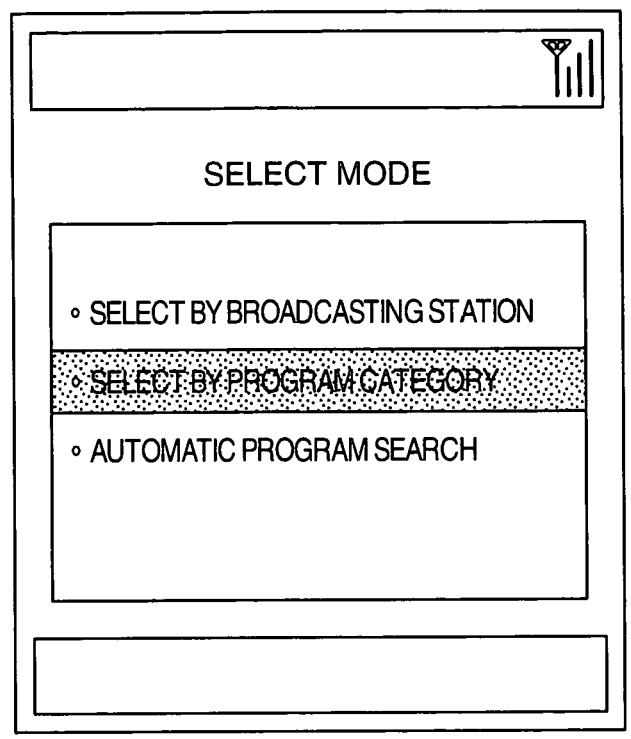
FIG. 12 is a diagram illustrating a screen on which the user selects a desired mode.

FIG. 5 shows processing (S31) for selecting a channel by station, processing (S32) for selecting a channel by program category, and processing (S33) for automatically searching for a program. A selection made to one of these processing options can be set by a variety of techniques. For example, the processing options may be displayed on the screen to prompt the user to select one. Alternatively, the communication terminal may be provided with buttons associated with a station-based selection and a category-based selection, such that the user is allowed to depress one of the buttons. Further alternatively, the user may be allowed to previously select one from the processing options. For the automatic program search, the communication terminal may be previously set to enter the automatic program search. FIG. 12 illustrates a screen for the user to select a desired option, and shows that the user has selected "SELECTION BY PROGRAM CATEGORY."

Figure 13:
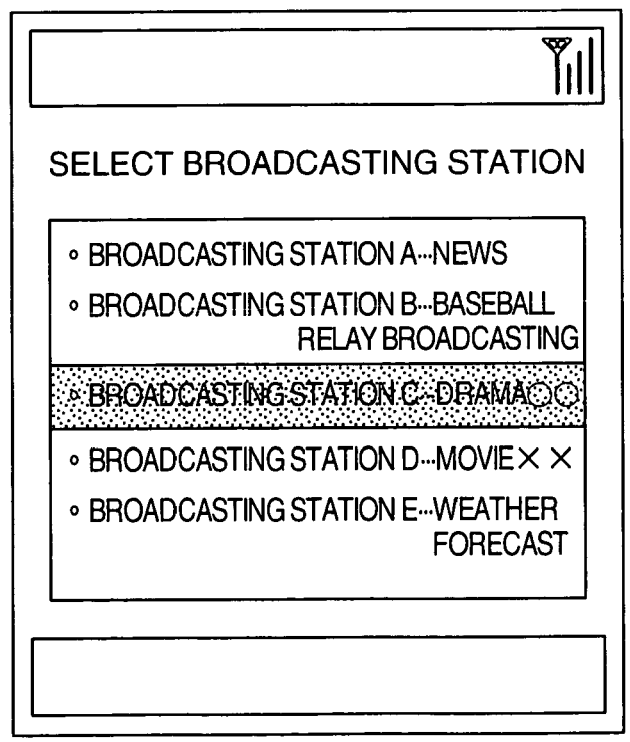
FIG. 13 is a diagram illustrating a screen on which the user selects a desired broadcasting station.

For selecting a program by broadcasting station (S31), TV programs currently available at a current position are displayed on the screen as grouped for each broadcasting station, such that the user can select one from these TV programs. Alternatively, the communication terminal may be provided with buttons associated with respective broadcasting stations, one of which may be depressed by the user to select a desired program. In this event, a warning may be displayed on the screen if the user selects a program which cannot be received at the current position. The TV program information can be previously stored in the communication terminal by EPG or the like, acquired as needed by accessing the server, or acquired from information included in broadcasting data of the digital broadcasting. FIG. 13 illustrates a screen for the user to select a desired broadcasting station, and shows that the user has selected "BROADCASTING STATION C . . . DRAMA ○○."

Figure 14:
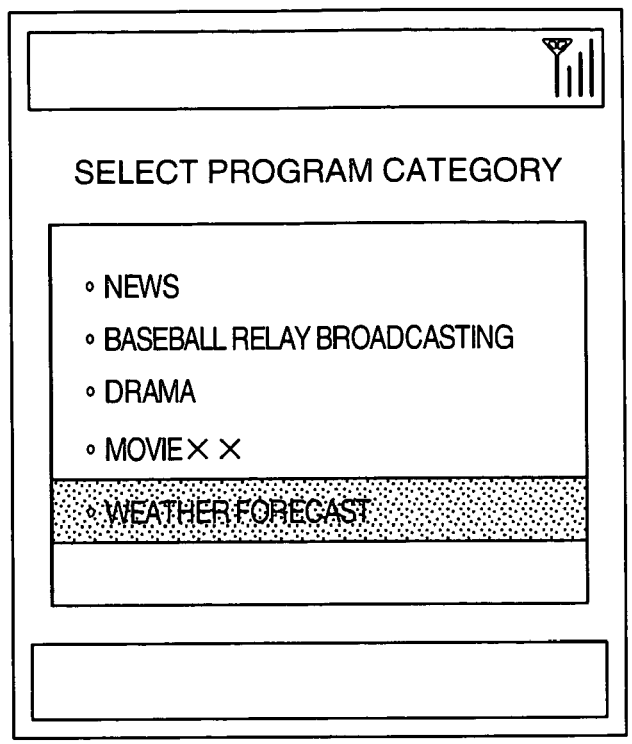
FIG. 14 is a diagram illustrating a screen on which the user selects a program in a desired category.

For selecting a program by category (S32), TV programs available at the current position are displayed on the screen as grouped for each category, such that the user can select one from these TV programs. Alternatively, the communication terminal may be provided with buttons associated with respective categories, one of which may be depressed by the user to select a desired program. In this event, a warning may be displayed on the screen if the user depresses a button associated with a program which cannot be received at the current position. The program category information can be previously stored in the communication terminal by EPG or the like, acquired as needed by accessing the server, or acquired from information included in broadcasting data of the digital broadcasting. FIG. 14 illustrates a screen for the user to select a desired program category, and shows that the user has selected "WEATHER FORECAST."

For entering the automatic program search (S33), when a TV program has been selected by station, the communication terminal is automatically set to a broadcasting station different from the currently selected broadcasting station. When a TV program has been selected by category, the communication terminal is automatically set to a broadcasting station different from a currently selected broadcasting station among those broadcasting stations which are classified according to category. When a TV program has been directly specified with a button or the like, the communication terminal selects a broadcasting station different from the specified broadcasting station. Broadcasting stations may be selected in the order of names of broadcasting stations which are broadcasting programs available at the current position, or in the order of frequency.

Upon completion of the selection for a desired TV program through the program selection processing, the aforementioned TV function is activated, or the TV channel is switched (S34) to continue to watch a program.

While the foregoing description has been made in a scenario in which the TV broadcasting frequency is switched, the TV broadcasting frequency may not be switched. For example, when a speech can be heard even with a disturbed video image, the speech alone can be allowed to stream while the video image is stopped. With a news program and a sport relay program, the user can understand the contents to some extent only with announcer's speech, and some user may even want to only hear the speech.

As described above, the communication terminal according to the first embodiment of the present invention can set the TV broadcasting tuner to an optimal TV broadcasting frequency for receiving a desired program from the base station information. Particularly, since even the communication terminal on the move can automatically set the TV broadcasting tuner to an optimal TV broadcasting frequency at the destination, the communication terminal can automate a tuning operation which would otherwise have to be manually done by the user.

Also, even when the communication terminal moves at a high speed, the neighborhood information and record information stored in the communication terminal enable *communication terminal to immediately switch the TV broadcasting frequency when the communication terminal moves into an adjacent TV broadcasting receivable area or into a TV broadcasting receivable area into which the communication terminal has moved in the past.

Also, even when the communication terminal moves into other than an adjacent TV broadcasting receivable area, the communication terminal newly acquires neighborhood information on that area and an area adjacent to the area through an external network, so that the communication terminal can immediately switch the TV broadcasting frequency once the neighborhood information has been acquired. For example, when the user watchs a TV program overseas using the communication terminal, the communication terminal can allow the user to do so using the base station information as long as it is located in an area in which the TV broadcasting can be received.

When the signal strength of TV broadcasting is equal to or lower than a predefined value so that the TV broadcasting cannot be received, the communication terminal automatically switches to another broadcasting station which is providing the same program, thereby permitting the user to continuously watch the same program. When there is no broadcasting station which is broadcasting the same program in the same area, the communication terminal can automatically switch to a program of the same category or to a program provided by a broadcasting station belonging to the same family from a method by which a program was selected the last time. Thus, the user need not manually select a program if he wants to continuously watch a similar program.

While the foregoing embodiment has been described in connection with the communication terminal which acquires information on an adjacent area, the communication terminal may acquire information on areas other than the adjacent area. In this way, the communication terminal can acquire information without connection to the outside even when the communication terminal moves beyond the adjacent area, for example, when the user, carrying the communication terminal, travels by air, so that the communication terminal can immediately switch the TV broadcasting frequency. Conversely, the communication terminal may acquire information on a limited area centered at a current position. In the latter case, although the communication terminal needs to newly acquire information on a destination area in each movement, the storage capacity can be saved to reduce the size and cost of the communication terminal.

Figure 15:
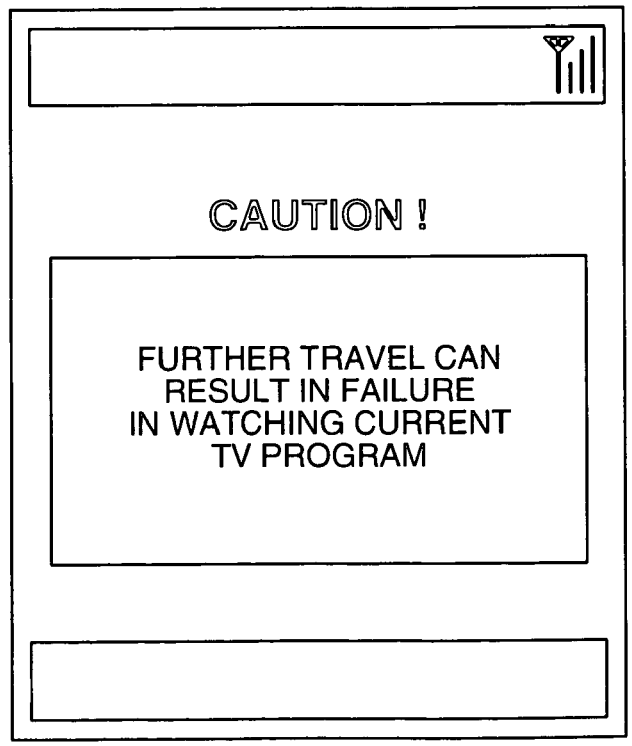
FIG. 15 is a diagram illustrating a screen on which a warning is displayed.

When a program currently watched by the user is not broadcasted in an adjacent TV broadcasting receivable area and therefore cannot be received even if the TV broadcasting tuner is switched to a TV broadcasting frequency in the adjacent TV broadcasting receivable area, the communication terminal can previously display a warning on the screen, indicating that the user cannot continue to watch the program currently on the air from the broadcasting station, or can generate an alarm sound. FIG. 15 illustrates a screen on which such a warning is displayed.

In regard to the configuration of the communication terminal in the first embodiment, the communication terminal is not limited to the reception of TV broadcasting by the TV broadcasting reception tuner 8 and TV broadcasting modulator/demodulator 9, but may be provided with a radio broadcasting reception tuner and radio broadcasting modulator/demodulator for radio broadcasting, or may be provided with a data broadcasting reception tuner and a data broadcasting modulator/demodulator for data broadcasting. In essence, the communication terminal may be provided with a combination of a tuner and a modulator/demodulator suited to a particular broadcasting form. With such a strategy, the communication terminal can receive a variety of forms of broadcasting.

(Second Embodiment)

A second embodiment of the present invention will be described with reference to the accompanying drawings.

Figure 9:
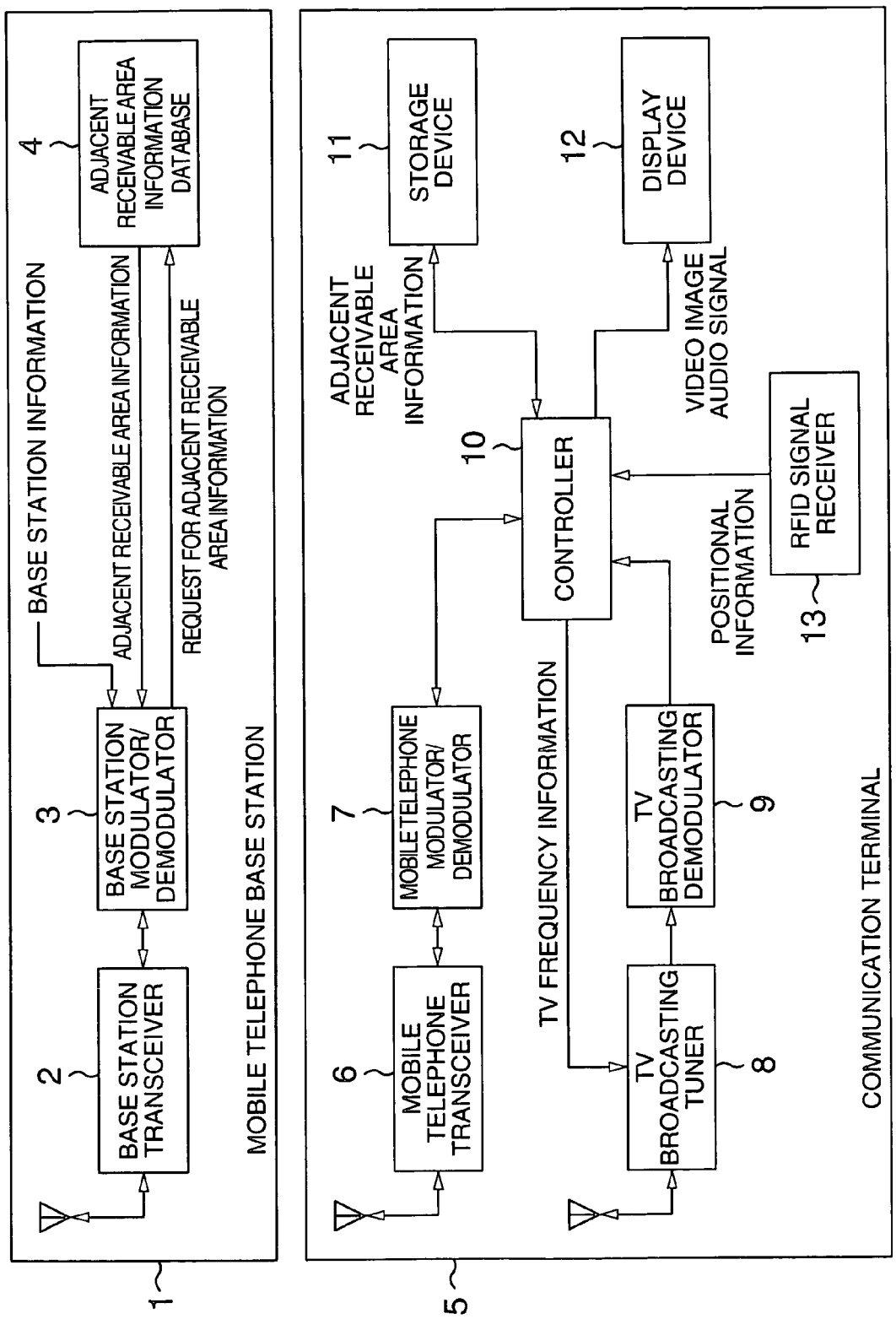
FIG. 9 is a block diagram illustrating the configuration of a communication terminal in a second embodiment of the present invention.

Referring first to FIG. 9, description will be made on the configuration of a communication terminal and a base station in the second embodiment.

A base station 1 is similar to that in the first embodiment (FIG. 1), so that description thereon is omitted.

While a communication terminal 5 is also substantially similar to that in the first embodiment (FIG. 1), the communication terminal 5 of the second embodiment differs in that an RFID signal transceiver 13 is added. RFID may be installed, for example, on a wall, a ceiling, a device, and the like, so that the RFID signal transceiver 13 receives positional information transmitted from the RFID. RFIDs are classified into one which transmits information on the position at which it is installed in response to a radio signal indicative of a request for positional information, and one which continues to transmit information on the installed position at all times. The second embodiment may employ any of these two alternatives.

The communication terminal 5 can acquire information on a current position as the RFID signal transceiver 13 receives the positional information transmitted from the RIFD. The received positional information is sent to the controller 10 and stored in the storage device 11. The information on the current position may be stored in formats as shown in FIG. 10 or 11, respectively, as the record information or neighborhood information. In other words, the base station information in the first embodiment is stored as replaced with the positional information. The process associated with the activation of the TV function (FIG. 3) and the process during TV watching or watching (FIG. 4) are also similarly executed except that the base station information is replaced by the positional information.

The positional information can be acquired with a higher accuracy when the current position is acquired by the RFID than with a positional information acquiring means such as the GPS. Also, detailed positional information can be available in any area in which the RFID is installed for transmitting positional information. Specific positional information may describe, for example, a seat G in a room F on the E-th floor in a building D located at address C in city B in Prefecture A. Detailed positional information can be let know depending on the quantity of RFIDs and on the locations at which the RFID are installed. When the TV broadcasting is locally made in a limited small area, with a TV broadcasting receivable area smaller than a base station information receivable area, the communication terminal according to the first embodiment fails to appropriately switch the TV broadcasting frequency. In contrast, the communication terminal according to the second embodiment can know detailed positional information, and can therefore appropriately switch the TV broadcasting frequency even in such a small area.

As is apparent from the foregoing, the communication terminal of the second embodiment can switch the TV broadcasting frequency even when the TV broadcasting area is smaller than the base station information receivable area. Consequently, the communication terminal can automatically set a TV broadcasting frequency at which a desired program is broadcast, even when the TV frequency must be switched in a region to which GPS radiowaves do not reach.

Alternatively, in the second embodiment, the controller 10 may determine that the communication terminal moves from one TV broadcasting receivable area to another using either the RFID-based positional information or the base station information. In this way, the communication terminal can set an optimal TV broadcasting frequency both when the TV broadcasting receivable area is larger than the base station information receivable area and when the former is smaller than the latter. With the use of techniques demonstrated in the first and second embodiments, the communication terminal can immediately switch the TV broadcasting frequency with lower power consumption.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communication terminal device comprising:
    a TV broadcasting receiver for receiving TV broadcasting;
    a display unit for displaying a video image of the received TV broadcasting;
    a communication unit for making communications; and
    a storage unit for storing information;
    wherein said communication unit acquires a TV broadcasting frequency corresponding to a TV broadcasting area,
    said storage unit is responsive to a movement of said communication terminal device from one TV broadcasting area to another, for storing TV broadcasting frequencies corresponding to the TV broadcasting areas, and storing signal strengths of said TV broadcasting frequencies, and
    said TV broadcasting receiver receives a TV broadcasting at a TV broadcasting frequency being one of a TV broadcasting frequency acquired corresponding to a TV broadcasting area of a device current position and a corresponding TV broadcasting frequency stored in said storage unit, said one TV broadcasting frequency having a higher signal strength than that of the other TV broadcasting frequency.

2. A method for controlling a communication terminal device with a TV function, comprising the steps of:
    storing information representing a first TV broadcasting receivable area and a first TV broadcasting frequency corresponding to an area of a first base station into which the communication terminal device has moved in the past, and a first signal strength of a TV broadcasting received at the first TV broadcasting frequency in the first base station area;
    acquiring information representing a second TV broadcasting receivable area and a second TV broadcasting frequency corresponding to an area of a second base station which is different from the first base station, when the communication terminal device moves to the second base station area;
    receiving a TV broadcasting at the acquired second TV broadcasting frequency in the second base station area;
    storing the information representing the second TV broadcasting receivable area, the information representing the second TV broadcasting frequency, and a second signal strength of the TV broadcasting received at the second TV broadcasting frequency;
    comparing the information representing the first TV broadcasting receivable area and the information representing the second TV broadcasting receivable area, when the communication terminal device moves from the second base station area to the first base station area;
    comparing the signal strength of the TV broadcasting received at the second TV broadcasting frequency in the first base station area and the stored first signal strength of the TV broadcasting received at the first TV broadcasting frequency, when the first TV broadcasting receivable area is different from the second TV broadcasting receivable area; and
    receiving a TV broadcasting at the second TV broadcasting frequency without a frequency switch to the first TV broadcasting frequency even if the communication terminal device moves from the second base station area to the first base station area, when the signal strength of the TV broadcasting received at the second TV broadcasting frequency is higher than the stored first signal strength of the TV broadcasting received at the first TV broadcasting frequency.

3. The method according to claim 2, wherein the comparison of the signal strengths is executed when the second TV broadcasting receivable area is different from the first TV broadcasting receivable area.

4. The method of claim 3, wherein the comparison of signal strengths is not executed when the second TV broadcasting receivable area is the same as the first TV broadcasting receivable area.

5. The method according to claim 2, further comprising the step of:
    acquiring information representing a TV broadcasting frequency corresponding to a TV broadcasting receivable area adjacent to the second TV broadcasting receivable area after a start of receiving the TV broadcasting at the second TV broadcasting frequency in the second base station area.

* * * * *